May 19, 1970 R. C. BASKIN 3,512,705

PLAYBACK SYSTEM

Filed Nov. 3, 1967 5 Sheets-Sheet 1

INVENTOR

Robert C. Baskin

BY

DeLio and Montgomery

ATTORNEYS

May 19, 1970 R. C. BASKIN 3,512,705

PLAYBACK SYSTEM

Filed Nov. 3, 1967 5 Sheets-Sheet 2

INVENTOR

Robert C. Baskin

BY

DeLio and Montgomery

ATTORNEYS

May 19, 1970 R. C. BASKIN 3,512,705

PLAYBACK SYSTEM

Filed Nov. 3, 1967 5 Sheets-Sheet 3

INVENTOR

Robert C Baskin

BY

De Lio and Montgomery

ATTORNEYS

May 19, 1970 R. C. BASKIN 3,512,705

PLAYBACK SYSTEM

Filed Nov. 3, 1967 5 Sheets-Sheet 4

INVENTOR

Robert C. Baskin

BY

DeLio and Montgomery

ATTORNEYS

May 19, 1970 R. C. BASKIN 3,512,705

PLAYBACK SYSTEM

Filed Nov. 3, 1967 5 Sheets-Sheet 5

INVENTOR

Robert C. Baskin

BY

DeLio and Montgomery

ATTORNEYS

United States Patent Office 3,512,705
Patented May 19, 1970

3,512,705
PLAYBACK SYSTEM

Robert C. Baskin, West Hartford, Conn., assignor to Ripley Company, Inc., Middletown, Conn., a corporation of New York Filed Nov. 3, 1967, Ser. No. 680,388
Int. Cl. G06k *1/18*; G08c *13/00*
U.S. Cl. 234—69 10 Claims

ABSTRACT OF THE DISCLOSURE

A playback system for writing information signals in in a parallel format on a storage media, said information signals obtained from a tape having a first channel in which the information signals are stored in a serial format and a second channel in which negation of the information signals is stored, comprising means for generating a command signal, stepper motor means responsive to said command signal for stepping the tape across readout means positioned to read out the signals detected by said readout means for converting the information to a parallel format, and means responsive to the signals stored in each of the channels for writing the information on the storage media.

This invention relates to a magnetic tape playback device and, more particularly to a magnetic tape playback device which is capable of converting serial binary information stored on tape into a parallel format or code which may then be used for punching a data processing card or for storing the information on a reel of tape or other suitable storage means used in conjunction with data processing equipment.

More particularly, this invention is or may be preferably utilized in conjunction with my invention entitled "Recorder System" filed the same day as this application in the U.S. Patent Office, and also assigned to Ripley Company, Inc.

The recorder system application referred to, discloses a magnetic tape recorder suitable for detecting information stored in a meter such as the usual type of commercial or residential watt-hour meter, water or gas meter or the like, and thereafter storing the information on tape in a serial format. The present invention provides a means for taking the information serially applied to the magnetic tape of the recorder system and converting it to a format suitable for use in present day data processing systems.

In view of the foregoing, the principal purpose of this invention is to provide a playback device which can take the information from a magnetic tape gathered in the field by a meter reader and convert it at the home office or data processing center of the utility for use in providing billing and other statistical information.

Accordingly, it is an object of this invention to provide a new and improved playback system for converting serial data on a magnetic tape or the like in a format suitable for data processing.

Another object of this invention is to provide a new and improved playback system suitable for use in conjunction with the recorder system, mentioned above, for converting the information obtained by the recorder system to a format suitable for data processing of a utility, or the like.

Still other objects and advantages of this invention will in part be obvious and will in part appear from the specification.

The invention accordingly comprises the features of construction, combination of elements and arrangement of parts which will be exemplified in the construction hereinafter set forth and the scope of the invention will be indicated in the claims.

For a fuller understanding of the invention, reference is had to the following description, taken in connection with the accompaying drawings, in which FIG. 1 is a block diagram of the playback system of this invention;

Figure 1:
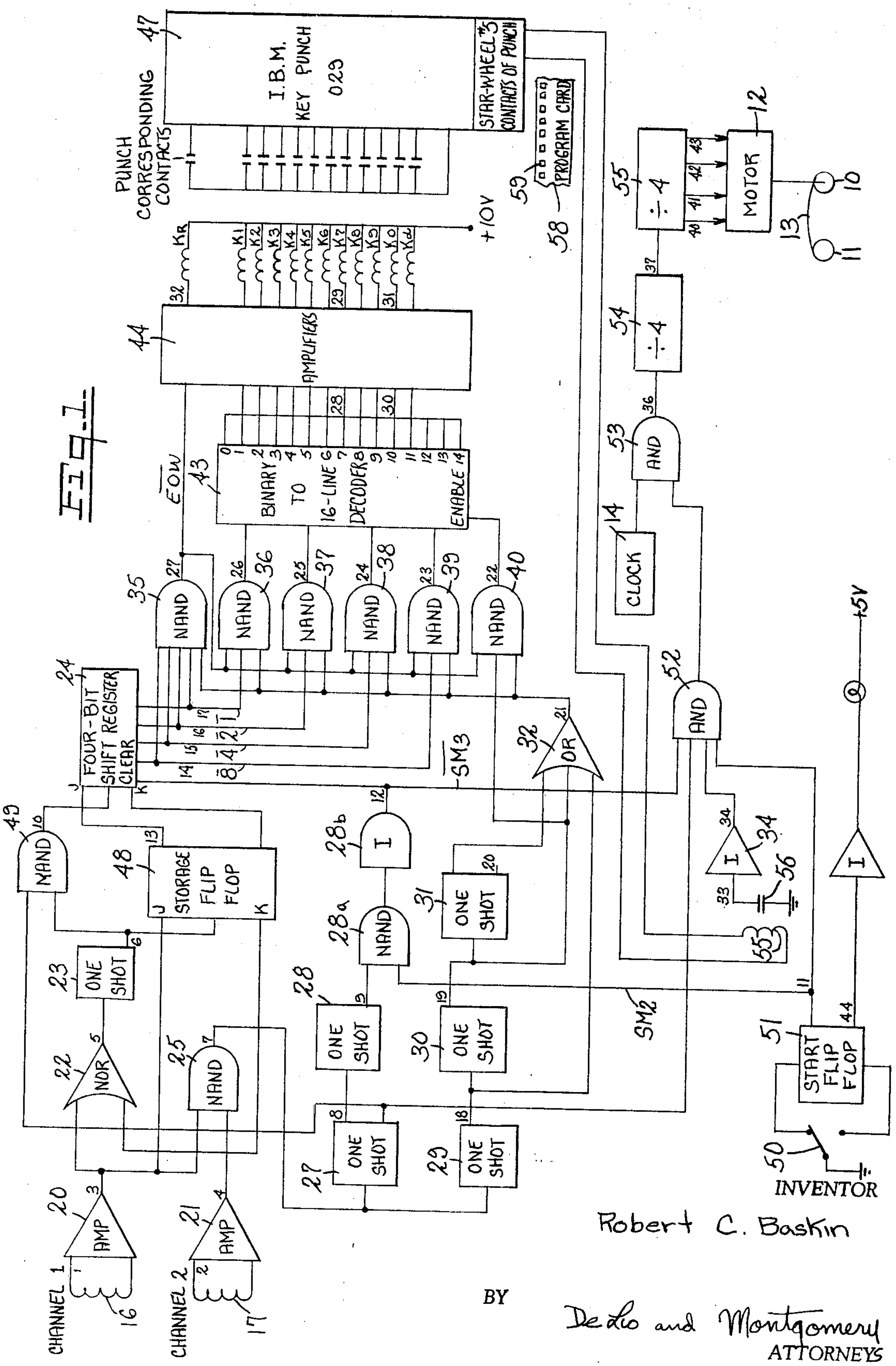

Referring to FIG. 1, there is disclosed the block diagram of the system. Tape reels are generally shown at 10 and 11, the reels being driven by a stepper motor 12 in a conventional manner. The stepper motor may be of the type model K82201 sold by A. W. Haydon & Company of Waterbury Conn. The magnetic tape is diagrammatically shown at 13 and moves by actuation of the stepper motor driving one of the reels in a well known manner.

The timing of the motor as well as the information portions of the system operates substantially independently of each other, for example, in this preferred form of the invention, the motor is driven as a function of signals, such as pulses provided from a clock shown at 14, whereas the flow of information through the serial to parallel data translator circuit as well as through the decoder and relay drivers is a function of the information and negation of signals stored in channels 1 and 2 of the tape and read out by heads which are generally shown at 16 and 17. The heads 16 and 17 are positioned so as to detect parallel positioned channels 1 and 2 on the magnetic tape 13.

Figure 2:
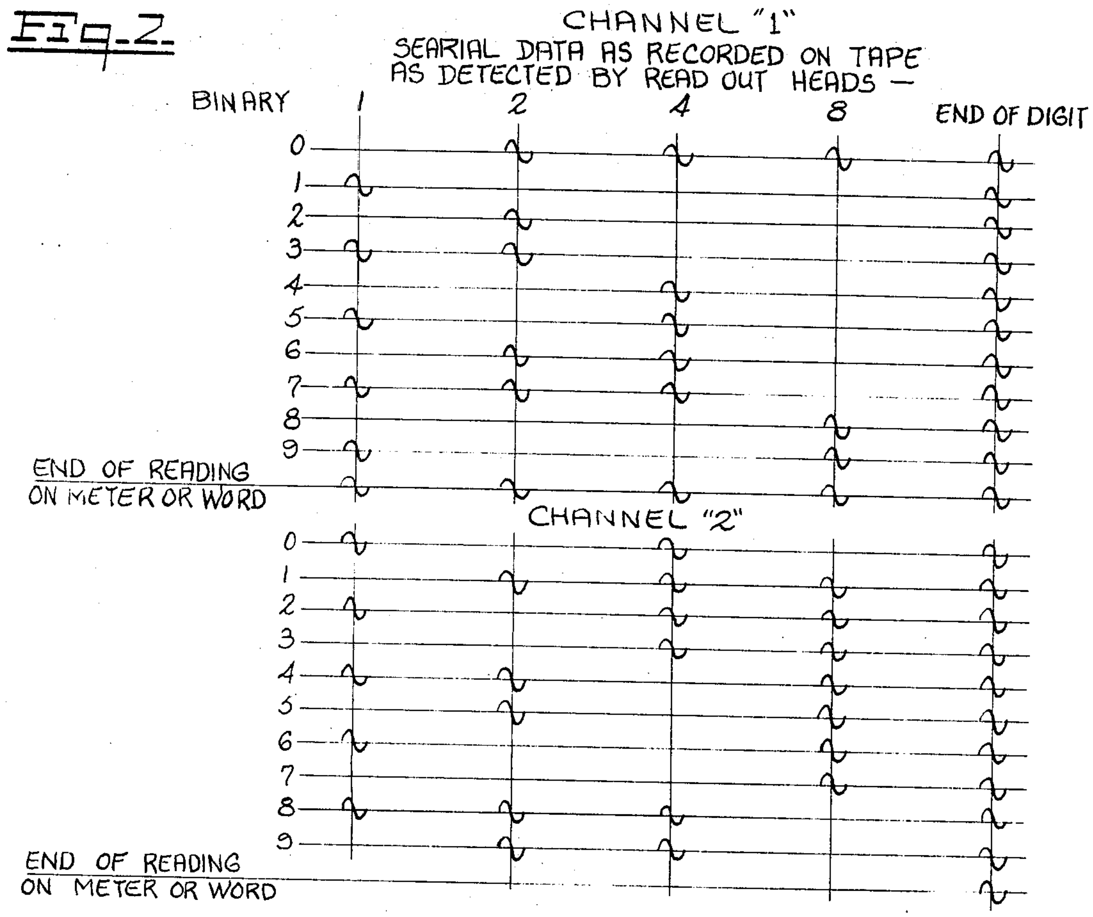
FIG. 2 is a chart illustrating the code of the data stored on the magnetic tape in channels 1 and 2 thereof and obtained by the recorder system, disclosed in the aforementioned co-pending application.

Referring now to FIG. 2, there is illustrated the data format stored on channels 1 and 2 as detected by the tape heads 16 and 17, respectively. The left hand portion of the graph indicates the decimal number and the upper portion of the graph indicates the binary coding used to represent the decimal number. The code on channel 1 differs in that a zero is indicated as a 2 and an 8. At the end of each digit there is provided an end of digit signal in the fifth time slot of the sequence of binary data, as shown. On channel 1 there is also provided an end of meter reading or end of word code, in which each of the time slots has a binary 1, 2, 4 and 8 as well as the end of digit position are full of data. The data in channel 2 is the negation of the data in channel 1, except for the end of digit as shown, and is used to control the information flow through the serial to parallel data translator circuit.

Referring again to FIG. 1, the data from channels 1 and 2 is detected by heads 16 and 17 and then amplified by amplifiers 20 and 21. The data on channel 1 ultimately is counted by a four bit shift register generally shown at 24. In order to accomplish this, signals from amplifiers 20 and 21 are applied to the J, K inputs of a storage flip-flop (such as Texas Instruments Type Ser. No. 7473N) and stored. Simultaneously clock or shift signals for moving the data through the shift register is obtained by passing the data from channels 1 and 2 through a NOR circuit 22 and a one-shot multivibrator 23. The output from the one shot 23 acts as a clock for the storage flip-flop 48 and also provides one input to an NAND gate 49. The output of the NAND gate 49 provides the clock signals necessary to move the data through the shift register 24. The other signal to operate the gate 49 is derived from two one shot flip-flops 27 and 28 including NAND 28*a* and inverter 28*b* which function as time delays. The one shots are responsive to the end of digit signals in channels 1 and 2. The end of digit signals are detected by a NAND circuit 25. Upon the detection of the end of digit signals, a signal from the one-shot disables the gate 49. At all other times the NAND gate 49 operates to provide clock pulses to control the flow of data through the register 24.

Upon registration of the end of digit signal the register 24 is cleared by signals applied from one-shot 28.

The signals from the shift register 24 appear at four output lines representing the binary 1, 2, 4 and 8, but in a parallel format. These signals are then gated through NAND gates 35–39 which are controlled from signals derived from time delay one-shots 29, 30 and 31 coupled to an OR circuit 32. The one-shots 29–31 are responsive to signals from the NAND gate 25 and, thus, are also controlled by the end-of-digit signals. Three one-shots are preferably used in this manner to insure that the data will be read out of the shift register 24 and into a binary to 16 line decoder 43 in time durations suitable to a plurality of storage means used in conjunction with data processing equipment. The 16 line decoder is utilized to provide the signals in a format to punch data on a card in an IBM "029" key punch by energizing amplifiers 44 which energizes punch relay coils K1–KR, as shown, to control corresponding punch contacts.

In order to enable the decoder 43 to receive data, the one-shot 30 also controls a NAND circuit 40 which provides signals to control the decoder 43.

The NAND circuit 35 functions to recognize an end-of-word signal on channel 1 and to disable the gates 36–40, as well as to provide a signal to the relay driver 44 for the key punch to tell the key punch shown at 47 to print an end-of-word code.

The operation of the serial to parallel data translator circuit will be given in more detail in conjunction with the description of FIG. 3. The operation of the binary to 16 line decorder will be given in more detail in conjunction with the description of FIG. 4.

In order to move the tape 13 across the heads 16 and 17, there is provided a switch shown as an "operate" switch, at 50 which controls a start-stop flip-flop 51. The flip-flop 51 provides signals to an AND gate shown at 52 and is also controlled from signals provided from a one-shot generally shown at 27. In addition, the AND gate 52 is controlled by a coil 55 which is energized by the use of IBM program card generally shown at 58 having punched therein a plurality of programming holes 59 and which, when operated in conjunction with star wheel number 5 of the 029 key punch, generates a signal to close a normally open contact 56 to activate AND gate 52. The AND gate 52 then provides a signal to AND gate 53 which permits signals from the clock 14 to pass through a ÷4 circuit shown at 54 and thence through a ÷4 logic circuit 55 which includes logic for providing four times sequence signals from the device. These four time signals are then utilized to sequentially step the tape 13 across the readout heads 16 and 17. The gate 52 also responds to the end of the digit signals from inverter 28*b* which inhibits the clock signals in order to stop the motor until the data is recorded on the card being punched by key punch 47.

Figure 3:
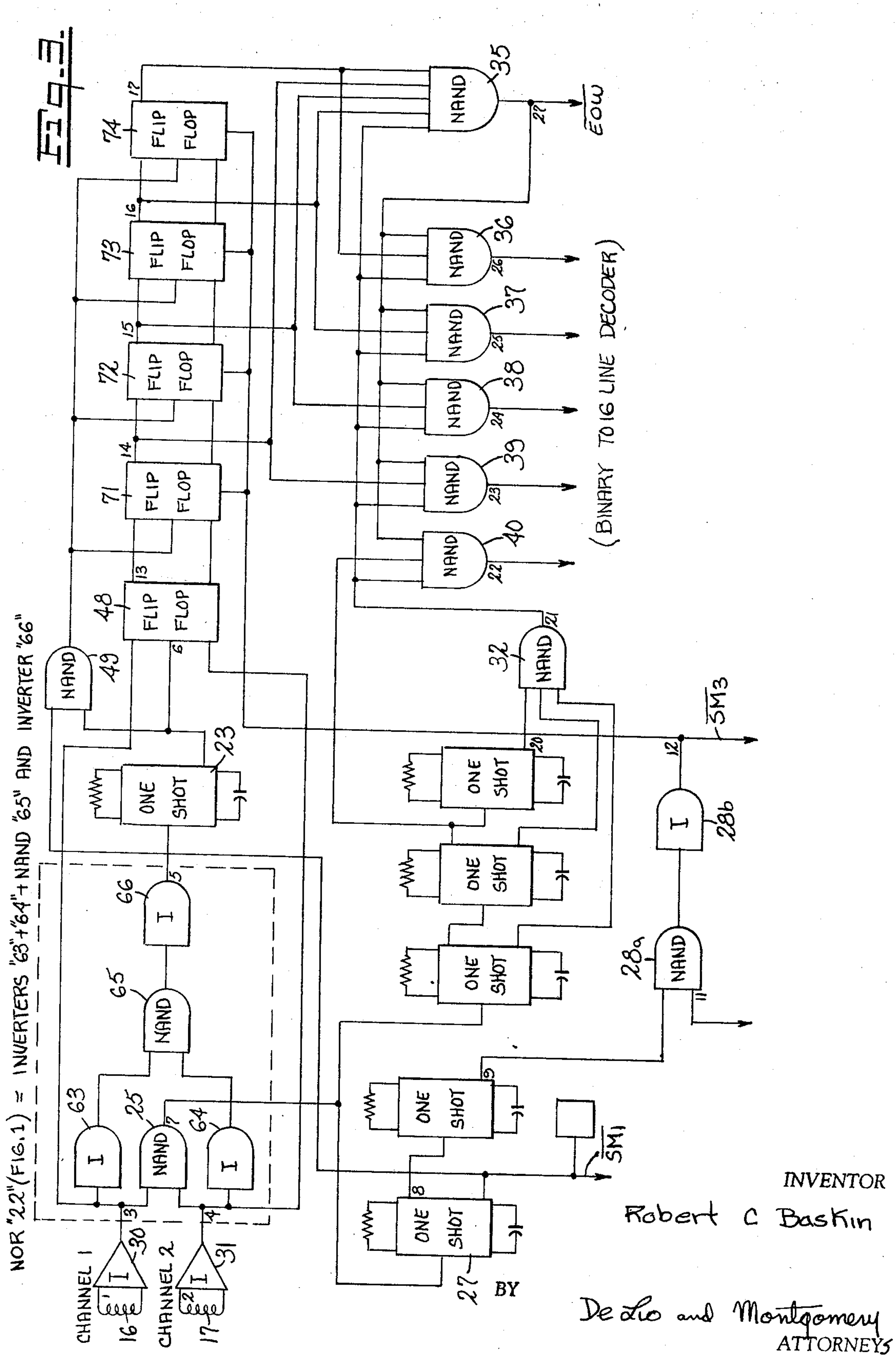
FIG. 3 is a block diagram illustrating the serial to parallel data translator portion of the block diagram of FIG. 1.

Referring now to FIG. 3, there is shown in more detail the serial to parallel data translator of FIG. 1. The blocks correspond to the blocks described in FIG. 1 except the NOR "22" block is achieved by using inverters 63, 64, 66 as well as NAND gate 65. In addition the shift register is shown comprising J–K flip flops 71–74 such as Texas Instruments Type SN 7473N.

The flow of data is as described with reference to FIG. 1.

Figure 4:
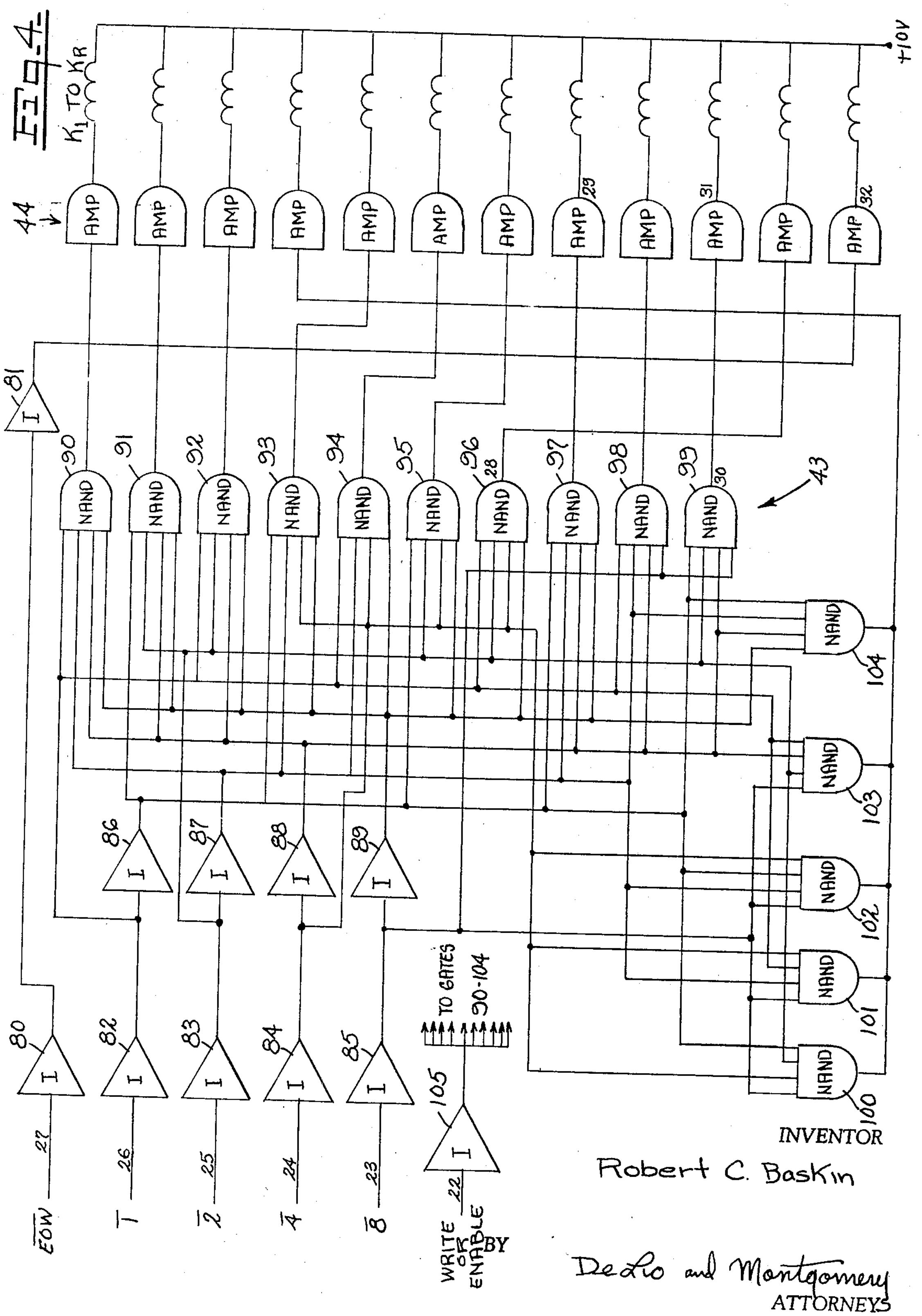
FIG. 4 illustrates the binary coded decimal to fifteen line decoder and the relay drivers shown in FIG. 1.

Referring now to FIG. 4, there is shown in block schematic form the decoder 43 and the output relay driver amplifiers 44. The signal $\overline{\mathrm{EOW}}$ passes directly through inverters 80 and 81 and is used to energize a coil KR which is the coil which causes the key punch to release the card which is being punched. The signals $\overline{1}$, $\overline{2}$, $\overline{8}$ and $\overline{4}$ are decoded by the use of inverters 82–89 and NAND circuits 90–99 to generate the decimal code 0–9. The signals which appear at the output of the NAND gates drive amplifiers 44 to energize coils K0–K9 of the punch in order to punch the key punch card.

In addition, the signals $\overline{1}$, $\overline{2}$, $\overline{4}$ and $\overline{8}$ are used in conjunction with NAND circuits 100–104 to generate error signals in the event there is an error. The NAND circuit 104 recognizes a 0000 code, the NAND circuit 101 recognizes a 1101 code (a thirteen), the NAND circuit 102 recognizes a 1100 code (a twelve), the NAND circuit 103 recognizes a 1011 code (an eleven), and the NAND circuit 100 recognizes a 1110 code (a fourteen). In the event there is an error, the K*d* coil will be energized to cause the key punch to punch out this fact. The $\overline{\text{write}}$, or enable signal, is applied through inverter 105 to control the flow of information through gates 90–104.

Figure 5:
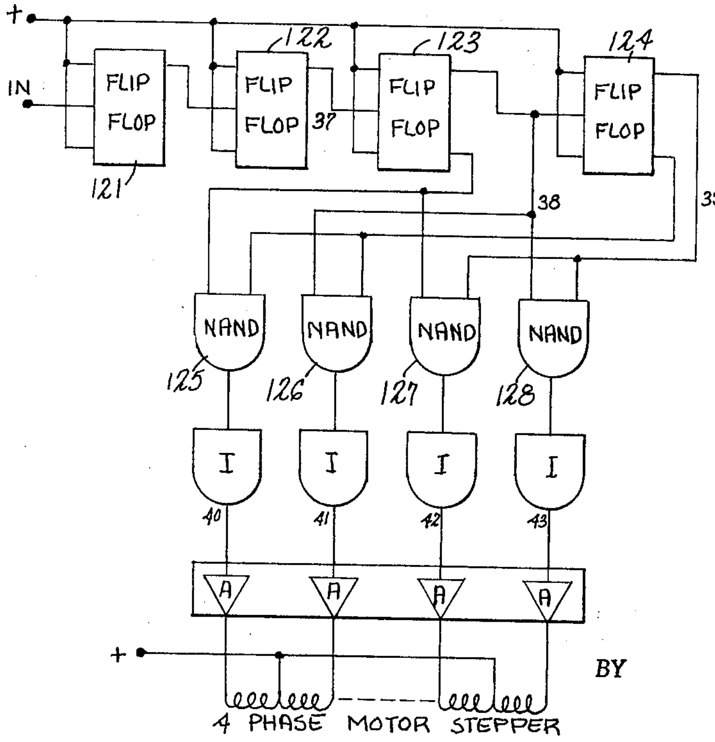
FIG. 5 is a block diagram illustrating the divide by 4 circuit and the motor for driving the tape according to this invention.

Referring now to FIG. 5, there is shown the ÷4 circuit 55 for providing four time-sequenced signals to the motor 12. This is accomplished by the use of four J–K flip-flops 121–124 (of the type previously mentioned) which are responsive to clock signals divided by four. By the use of four NAND circuits 125–128 and four inverters connected as shown to the flip-flops 123 and 124, four such time-sequenced signals are provided to stop the four-phase stepper motor 12.

Figure 6:
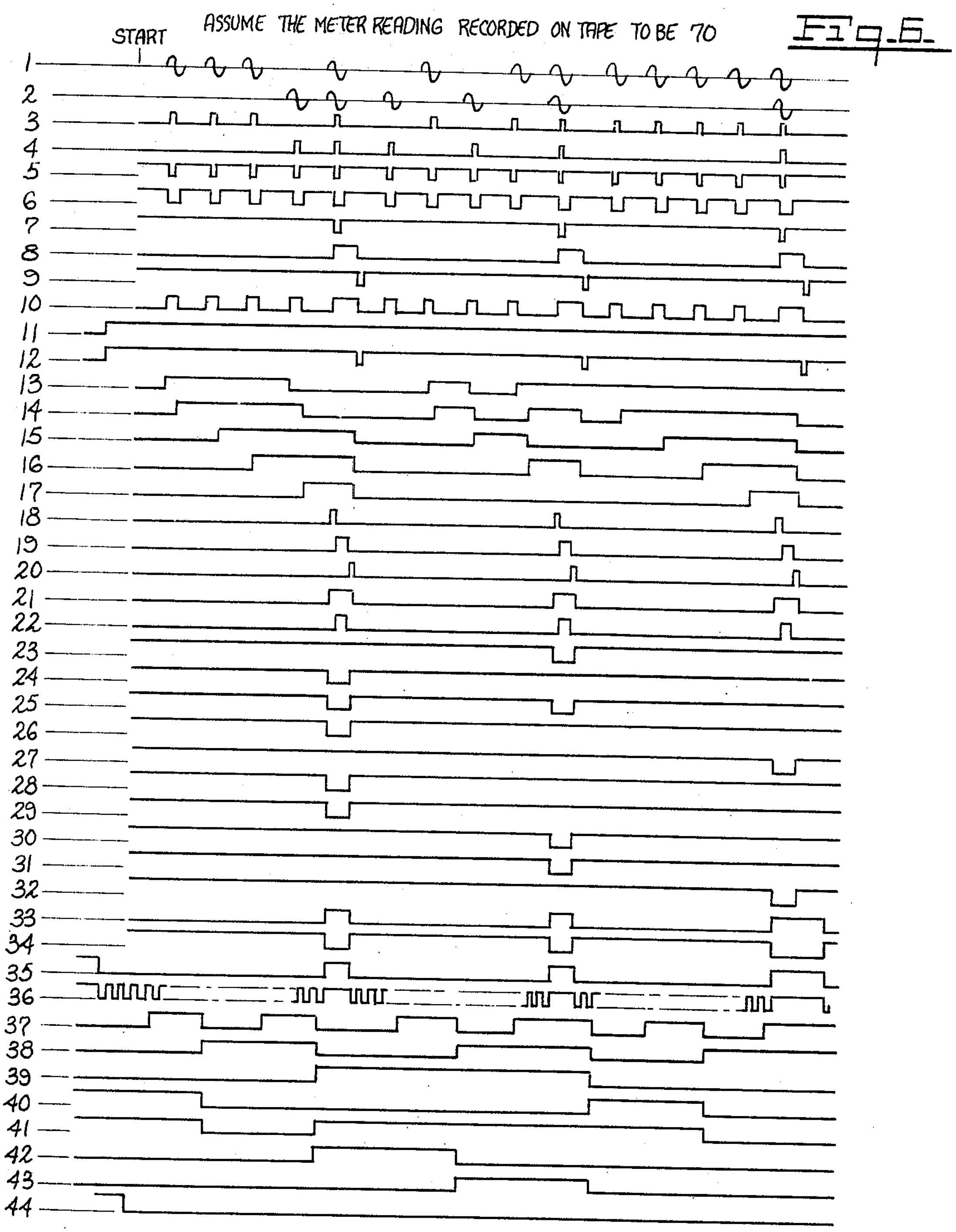
FIG. 6 is a timing chart illustrating the conversion of a 7 and a 0 stored serially on a magnetic tape to a code suitable for operating a keypunch.

Referring now to FIG. 6 in conjunction with FIGS. 1–5, for a description of the operation in a case where the data on channel 1 represents a 7 and a 0 followed by an end-of-word signal and the data on channel 2 is the negation of the data on channel 1. In each case, the end-of digit appears on channels 1 and 2. As may be seen, various points 1–44 have been numbered and appear at the outputs of various circuits in the system. The numbers 1–44 also appear in FIG. 6 in order to illustrate the waveforms of the signals appearing at these points in their proper timed sequence. For example, the point 22 is at the output of NAND circuit 40 and the waveform at point 22 is shown in the waveform diagram in FIG. 6 at 22.

If we assume now that the switch 50 is moved to the "operate" position, the system will start operation. As will be noted, where the first number to be converted is a 7, the first three positions indicative of a 1, 2 and 4 are full in channel 1 and the 8 position in channel 2 is occupied as shown in FIG. 6. End of digit signals are present on both channels 1 and 2. At the output of the amplifier 20 there are provided the pulses shown at 3. At the output of the amplifier 31, channel 2, there are provided the output signals as shown at 4 in the timing diagram. The signals in 3 and 4 then go through NAND circuit 25, which provides an output signal at all times except when there are two simultaneous signals present (see point 7). To generate the signal waveform 5, the signals at point 3 and 4 pass through a NOR circuit 22. Thus, whenever a signal is present on line 3 or 4, a signal will not be present at point 5. The signal at point 5 is then utilized to trigger the one-shot multivibrator 23 to provide the output signal shown at 6. This output signal is, in effect, a clock signal which controls a flip-flop or bi-stable multivibrator which is shown at 48 in FIG. 1.

At the same time, signals from points 3 and 4, channels 1 and 2, are also provided to the flip-flop 48. Thereafter the input signals are counted by the four register 24 flip-flops shown at 71–74. These flip-flops are controlled from a signal obtained at point 10 from NAND circuit 49 which in turn is controlled by the output signal from the one-shot multivibrator 23 and also from a signal derived from the one-shot 27. This signal is opposite to the signal shown at point 8 in the timing diagram. The remaining signals control the flow of information through the flip-flops 71–74. Thereafter, the signals at 14 and 15 are brought through the NAND circuits which are shown at 35–38, to provide the output signals indicated at 23–26. In addition, end of word waveform is shown at 27 and the write or enable signal is obtained from NAND circuit 40 to control the binary coded decimal decoder.

Now referring to FIG. 4, the operation continues in the same manner upon the sensing of a 0 in channel 1 and then also continues upon the sensing of a end of meter reading signal in channel 1. In this figure in block form there is diagrammatically shown the binary to 16-line decoder. As may be observed, the end of word and 1, 2, 4, 8 lines as well as the right line emanating from the serial to parallel data translator circuit is converted by a plurality of NAND circuits in the format required for triggering the relays of an IBM key punch so as to write the information in the code utilized by the punch.

It should be understood that any other type of code could be produced by using a binary to other type of coded format device. This diagram is included solely to illustrate the preferred embodiment wherein the binary data is decoded and is written on a data processing card which may then be utilized in the data processing system.

The waveforms at point 28, 30, 29 and 31 and 32 are shown in the timing diagram solely to illustrate the output waveforms due to the presence of a 7 and a 0 in channel 1 of the tape.

It is to be understood that instead of an IBM key punch, any other type device providing a recording medium such as a paper tape could be punched or the information could be fed directly into the memory of a computer, or onto an auxiliary tape system.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A playback system for writing information signals in a parallel format on a storage media, said information signals obtained from a tape having a first channel in which the information signals are stored in a serial format and a second channel in which negation of the information signals is stored, comprising means for generating a command signal, stepper motor means responsive to said command signal for stepping the tape across readout means positioned to read out the signals in both channels, converting means responsive to the signals detected by said readout means for converting the information to a parallel format, and means responsive to the signals stored in each of the channels for writing the information on the storage media.

2. A system according to claim 1, including means responsive to signals generated from each of said channels to block said command signal to prevent the stepping of the tape across said readout means.

3. A system according to claim 1, including means responsive to signals stored in each of the channels for controlling the flow of information signals through said converting means.

4. A system according to claim 1, wherein said converting means includes a shift register, said shift register responsive to signals provided from each of said channels to convert the serial information signal to a parallel format.

5. A system according to claim 2, in which the means for generating a command signal includes means responsive to signals provided from means for writing the information on the storage media.

6. A system according to claim 5, including means for dividing the command signal into four time-sequenced signals to step the motor in order to step the tape across the readout means.

7. A system according to claim 1, including means for recognizing an end of word information code and writing the same on the recording media.

8. A system for converting serially recorded information signals stored on tape to a parallel format, said tape having a first channel with the information signals stored thereon and a second channel having the negation of the information signals stored therein, comprising in combination means for reading off the information and negation of information signals, means for converting the information signals to a parallel format, and means responsive to the information and negation of information signals for controlling the flow of information signals through said means for converting.

9. A system according to claim 8 including means responsive to said information and negation of information signals for controlling the movement of the tape across said means for reading.

10. A system according to claim 8 including means for moving the tape across the means for reading.

References Cited

UNITED STATES PATENTS

| | | | |
|---|---|---|---|
| 2,945,221 | 7/1960 | Hinton et al. | 340—347 |
| 3,085,236 | 4/1963 | Witt | 340—347 |

WILLIAM S. LAWSON, Primary Examiner

U.S. Cl. X.R.

340—347